UNITED STATES PATENT OFFICE.

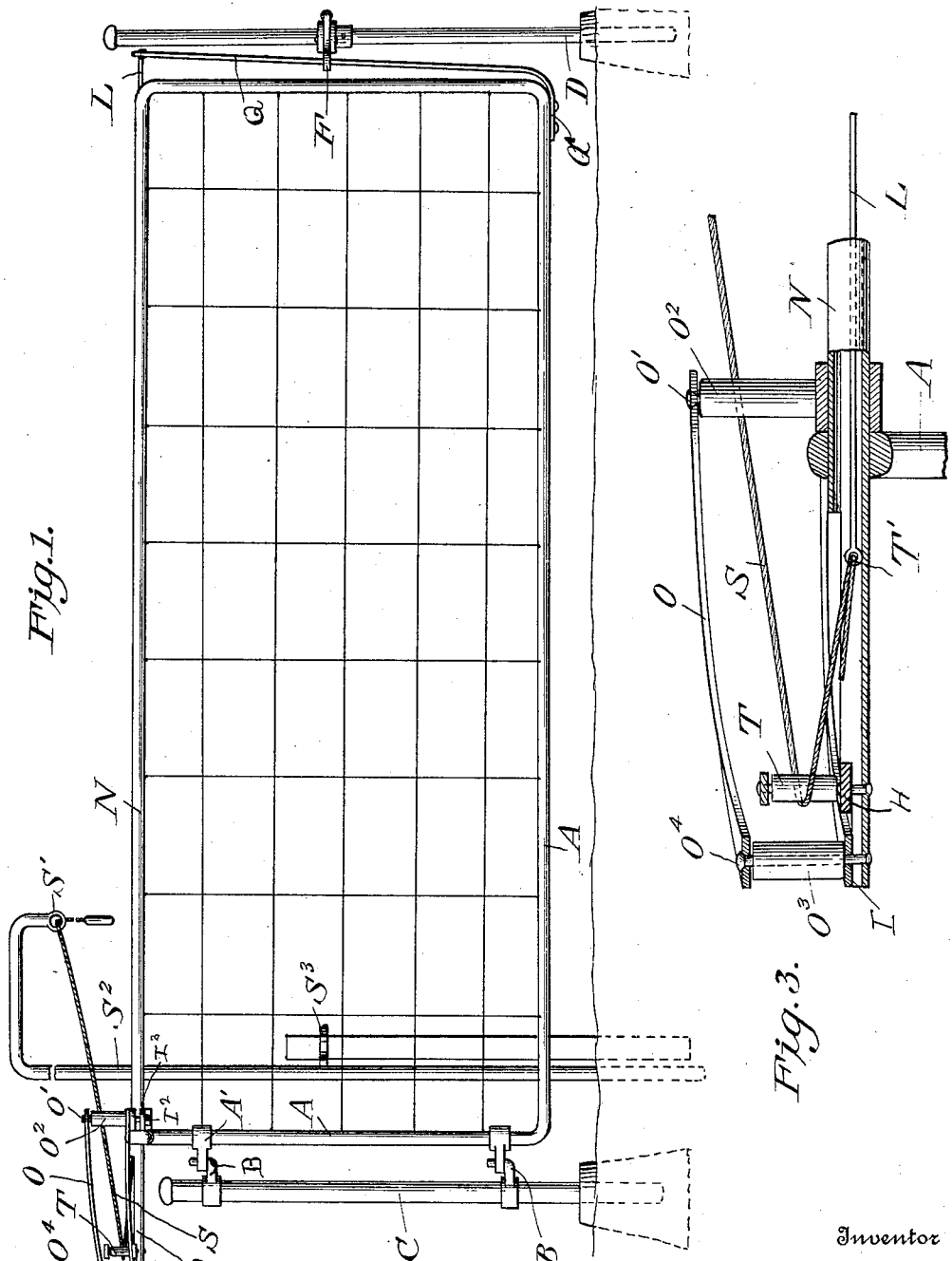

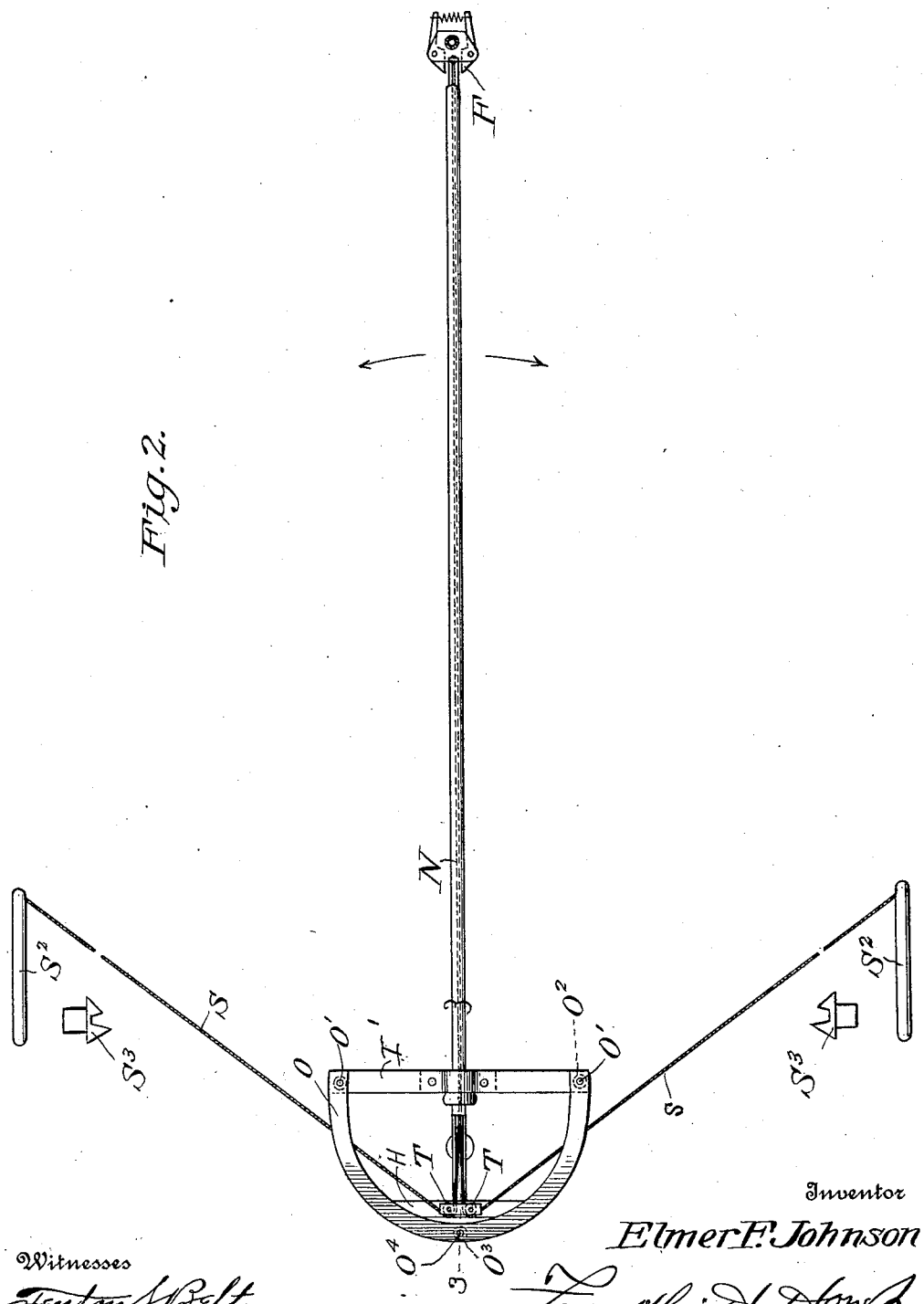

ELMER FOREST JOHNSON, OF CHILLICOTHE, OHIO, ASSIGNOR OF ONE-HALF TO GEORGE W. JOHNSON, OF CHILLICOTHE, OHIO.

GATE-OPENER.

1,094,335.  Specification of Letters Patent.  Patented Apr. 21, 1914.

Application filed July 21, 1913. Serial No. 780,329.

*To all whom it may concern:*

Be it known that I, ELMER F. JOHNSON, a citizen of the United States, residing at Chillicothe, in the county of Ross and State of Ohio, have invented certain new and useful Improvements in Gate-Openers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gate opening devices and comprises a simple and efficient apparatus of this nature having various details of construction and combinations and arrangements of parts which will be hereinafter fully described, shown in the accompanying drawings and then specifically defined in the appended claim.

I illustrate my invention in the accompanying drawings, in which:—

Figure 1 is a side elevation of a gate with latch and opening device made in accordance with my invention. Fig. 2 is a top plan view. Fig. 3 is a sectional view on line 3—3 of Fig. 2.

Reference now being had to the details of the drawings by letter, A designates a gate, the upper rail N of which projects rearwardly beyond one end of the gate. Collars A' have eyes which are pivoted to the hooks B which are fastened to the post C. Latch jaws F are mounted upon the post D and are engaged by a spring latch bar Q. Said projecting portion of the gate is cut away and upon the upper edges thereof are mounted the two bars H and I, the former of which is straight while the other is semicircular in outline, and the ends of the bar I are fastened to a crosspiece I' which is clamped to the projecting portion of the gate by means of the bolts $I^2$ and the plate $I^3$. A second semi-circular bar O is mounted upon the spacing members $O^3$ through which the bolts $O^4$ pass and antifriction rollers T are mounted upon pins supported by the bars H. Other antifriction rollers, designated by letter $O^2$, are mounted upon the vertically disposed pins O' which pass through the bars O. A rope S is passed through an eye T' upon the rod L, thence passes about the vertically disposed rollers T and apertures S' in the poles $S^2$ which are fastened in the ground, there being one mounted upon each side of the gate. Adjacent to each pole is a stop $S^3$ to limit the swinging movement of the gate.

The operation of my gate will be readily understood and is as follows: When approached from either direction, the gate may be opened by a person pulling upon the end of the rope S which, through its connections with the rod L, will cause the latch Q to be withdrawn from engagement with the hooks F forming the catch and a further pulling movement upon the rope will, by reason of the rope fulcruming over a point at the rear of the pivotal part of the gate, cause the latter to swing open. A reverse movement may be imparted to the gate by pulling upon the other rope. As the gate swings to a closed position, the latch rod will come in contact with one of the spring-pressed hooks or pawls F striking the inclined edge thereof, which will cause the same to tilt and allow the latch to pass by the same, after which the spring will return the hook to its normal position, thus forming retaining means for the latch bar.

What I claim to be new is:—

In combination with a swinging gate having an upper portion thereof which is tubular and projects beyond the rear end of the gate, the upper portion of said projecting part being cut away, a latch-engaging rod mounted in said tubular portion, semi-circular bars supported upon said tubular portion of the gate and spaced apart, a straight bar supported upon the edges of the extension of said gate, antifriction rollers journaled upon said straight bar, a rope passing through an eye upon said rod and passing about the antifriction rollers, and other vertically disposed anti-friction rollers journaled between the ends of said semi-circular bars, as set forth.

In testimony whereof I have hereunto affixed my signature in presence of two witnesses.

ELMER FOREST JOHNSON.

Witnesses:
ROBT. W. ALEXANDER,
ROBERT THOS. WEAVER.

---

Copies of this patent may be obtained for five cents each, by addressing the "Commissioner of Patents, Washington, D. C."